(12) United States Patent
Yura et al.

(10) Patent No.: US 11,996,544 B2
(45) Date of Patent: May 28, 2024

(54) COIN-SHAPED LITHIUM SECONDARY BATTERY AND IoT DEVICE

(71) Applicant: NGK INSULATORS, LTD., Nagoya (JP)

(72) Inventors: Yukinobu Yura, Nagoya (JP); Kazuki Maeda, Nagoya (JP); Shunsuke Mizukami, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 803 days.

(21) Appl. No.: 17/070,193

(22) Filed: Oct. 14, 2020

(65) Prior Publication Data

US 2021/0043919 A1 Feb. 11, 2021

Related U.S. Application Data

(63) Continuation of application No. PCT/JP2019/019169, filed on May 14, 2019.

(30) Foreign Application Priority Data

May 17, 2018 (JP) ................................ 2018-095781

(51) Int. Cl.
*H01M 4/131* (2010.01)
*H01M 4/02* (2006.01)
(Continued)

(52) U.S. Cl.
CPC ......... *H01M 4/131* (2013.01); *H01M 4/0471* (2013.01); *H01M 4/134* (2013.01);
(Continued)

(58) Field of Classification Search
CPC .... H01M 4/131; H01M 4/0471; H01M 4/134; H01M 4/525; H01M 4/661;
(Continued)

(56) References Cited

U.S. PATENT DOCUMENTS 6,783,894 B2 8/2004 Kajiura et al.
9,379,375 B2 6/2016 Sugiura et al.
(Continued)

FOREIGN PATENT DOCUMENTS

| CN | 203707230 | * | 7/2014 |
| JP | 2003-203671 A1 | | 7/2003 |

(Continued)

OTHER PUBLICATIONS

International Search Report and Written Opinion (Application No. PCT/JP2019/019169) dated Jul. 30, 2019 (with English translation).

*Primary Examiner* — Lisa S Park
(74) *Attorney, Agent, or Firm* — BURR PATENT LAW, PLLC (57) ABSTRACT

Provided is a coin-shaped lithium secondary battery including a positive electrode plate which is a lithium complex oxide sintered plate; a negative electrode plate which is a titanium-containing sintered plate; a separator interposed between the positive electrode plate and the negative electrode plate; an electrolytic solution with which the positive electrode plate, the negative electrode, and the separator are impregnated; and an exterior body having a closed space, the closed space accommodating the positive electrode plate, the negative electrode plate, the separator, and the electrolytic solution, the lithium secondary battery having a thickness of 0.7 to 1.6 mm and a diameter of 10 to 20 mm.

18 Claims, 4 Drawing Sheets

(51) Int. Cl.
*H01M 4/04* (2006.01)
*H01M 4/134* (2010.01)
*H01M 4/525* (2010.01)
*H01M 4/66* (2006.01)
*H01M 10/0525* (2010.01)
*H01M 50/409* (2021.01)
*H01M 50/429* (2021.01)
*H01M 50/44* (2021.01)
*H01M 50/46* (2021.01)

(52) U.S. Cl.
CPC ........... *H01M 4/525* (2013.01); *H01M 4/661* (2013.01); *H01M 10/0525* (2013.01); *H01M 50/409* (2021.01); *H01M 50/4295* (2021.01); *H01M 50/44* (2021.01); *H01M 50/46* (2021.01); *H01M 2004/021* (2013.01); *H01M 2004/027* (2013.01); *H01M 2004/028* (2013.01); *H01M 2300/004* (2013.01)

(58) Field of Classification Search
CPC ........... H01M 10/0525; H01M 50/409; H01M 50/4295; H01M 50/44; H01M 50/46; H01M 2004/021; H01M 2004/027; H01M 2004/028; H01M 2300/004; H01M 10/0585; H01M 4/485; H01M 10/0427; Y02E 60/10
See application file for complete search history.

(56) References Cited

U.S. PATENT DOCUMENTS

| | | | |
|---|---|---|---|
| 10,454,109 B2 | 10/2019 | Ohira et al. | |
| 10,629,905 B2 | 4/2020 | Yura et al. | |
| 2002/0081495 A1* | 6/2002 | Nakajima | H01M 4/525 429/232 |
| 2007/0048609 A1 | 3/2007 | Ueda et al. | |
| 2009/0087739 A1* | 4/2009 | Takahashi | H01M 4/505 429/188 |
| 2013/0157137 A1* | 6/2013 | Fukushima | H01M 10/052 429/231.1 |
| 2015/0372301 A1* | 12/2015 | Kim | H01M 10/052 252/182.1 |
| 2016/0118658 A1* | 4/2016 | Kawakami | H01M 4/505 427/126.3 |
| 2016/0181671 A1* | 6/2016 | Keates | H01M 10/0436 228/180.1 |
| 2016/0211506 A1* | 7/2016 | Yura | C30B 29/22 |
| 2017/0107117 A1* | 4/2017 | Takemoto | H01G 11/46 |
| 2019/0207249 A1* | 7/2019 | Nakanishi | H01M 10/36 |
| 2020/0135321 A1* | 4/2020 | Lebrun | G06F 21/33 |

FOREIGN PATENT DOCUMENTS

| | | | |
|---|---|---|---|
| JP | 2004-327282 A | | 11/2004 |
| JP | 2004-335185 A1 | | 11/2004 |
| JP | 2005-310578 A1 | | 11/2005 |
| JP | 2007-095670 A1 | | 4/2007 |
| JP | 4392189 B2 | | 12/2009 |
| JP | 5587052 B2 | | 9/2014 |
| JP | 2015-185337 A1 | | 10/2015 |
| JP | 2018-507451 A1 | | 3/2018 |
| WO | WO9324964 | * | 12/1993 |
| WO | 98/28804 A1 | | 7/1998 |
| WO | 2016/081582 A1 | | 5/2016 |
| WO | WO2016117499 | * | 7/2016 |
| WO | 2017/146088 A1 | | 8/2017 |
| WO | 2017/188232 A1 | | 11/2017 |

\* cited by examiner

COIN-SHAPED LITHIUM SECONDARY BATTERY AND IoT DEVICE

CROSS-REFERENCE TO RELATED APPLICATIONS

This application is a continuation application of PCT/JP2019/019169 filed May 14, 2019, which claims priority to Japanese Patent Application No. 2018-095781 filed May 17, 2018, the entire contents all of which are incorporated herein by reference.

BACKGROUND OF THE INVENTION

1. Field of the Invention

The present invention relates to a coin-shaped lithium secondary battery and an IoT device.

2. Description of the Related Art

Coin-shaped lithium secondary batteries are widely used in various devices that require charging, and various coin-shaped lithium secondary batteries have been proposed. For example, Patent Literature 1 (JP2004-335185A) discloses a coin-shaped lithium secondary battery in which a positive electrode, a negative electrode, a separator, and a non-aqueous electrolytic solution are accommodated in a closed space formed by a positive electrode can, a negative electrode can, and an annular insulating gasket, wherein the positive electrode is a pellet-shaped green body of a positive electrode mixture with a thickness of 500 μm or more, and the positive electrode has a conductive layer on its lateral surface. Patent Literature 2 (JP2005-310578A) discloses a coin-shaped secondary battery having a battery container accommodating an electrode group in which a positive electrode plate and a negative electrode plate are wound in a flat shape so that they are alternately stacked with a separator interposed therebetween, together with a non-aqueous electrolytic solution. Patent Literature 3 (JP4392189B) discloses a coin-shaped non-aqueous electrolyte secondary battery for reflow soldering, using an electrolytic solution with a lithium salt concentration of 1.5 to 2.5 mol/l, a lithium-containing manganese oxide such as $Li_4Mn_5O_{12}$ as a positive electrode active material, and a Li—Al alloy as a negative electrode active material. In such a secondary battery described above, a powder-dispersed positive electrode (so-called coated electrode) produced by applying a positive electrode mixture containing a positive electrode active material, a conductive agent, a binder, and the like, followed by drying, is employed.

Meanwhile, such powder-dispersed positive electrodes generally contain a relatively large amount (e.g., about 10% by weight) of components (binders and conductive agents) that do not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency. Some attempts have been made to improve the capacity and charge/discharge efficiency by positive electrodes or layers of positive electrode active material composed of lithium complex oxide sintered plate. In this case, since the positive electrode or the layer of positive electrode active material contains no binder or conductive agent, high capacity and satisfactory charge/discharge efficiency can be expected due to a high packing density of lithium complex oxide. For example, Patent Literature 4 (JP5587052B) discloses a positive electrode including a positive electrode current collector and a positive electrode active material layer connected to the positive electrode current collector with a conductive bonding layer therebetween. The positive electrode active material layer is composed of a lithium complex oxide sintered plate, and the sintered plate has a thickness of 30 μm or more, a porosity of 3 to 30%, and an open pore rate of 70% or more. Further, Patent Literature 5 (WO2017/146088) discloses use of an oriented sintered plate including a plurality of primary grains composed of lithium complex oxide such as lithium cobaltate ($LiCoO_2$), the plurality of primary grains being oriented at an average orientation angle of over 0° and 30° or less to the plate face in the positive electrode plate, as a positive electrode of a lithium secondary battery including a solid electrolyte.

Meanwhile, use of a titanium-containing sintered plate as a negative electrode has been also proposed. For example, Patent Literature 6 (JP2015-185337A) discloses a lithium secondary battery using a lithium titanate ($Li_4Ti_5O_{12}$) sintered body as a positive electrode or a negative electrode. However, this lithium secondary battery is an all-solid battery having a solid electrolyte layer between a positive electrode and a negative electrode and is not a secondary battery using a non-aqueous electrolytic solution.

CITATION LIST

Patent Literature

Patent Literature 1: JP2004-335185A
Patent Literature 2: JP2005-310578A
Patent Literature 3: JP4392189B
Patent Literature 4: JP5587052B
Patent Literature 5: WO2017/146088
Patent Literature 6: JP2015-185337A

SUMMARY OF THE INVENTION

With the spread of IoT devices in recent years, a small and thin coin-shaped lithium secondary battery with high capacity and high output which can be charged particularly at a constant voltage (CV) has been desired. Such a secondary battery which can be charged at a constant voltage does not need to be provided with a current control IC and is therefore advantageous for reducing the size and cost. Meanwhile, in order to efficiently produce IoT devices, it is desired to mount a coin-shaped lithium secondary battery on a circuit board by solder reflow, and therefore it is desired that the battery performance does not deteriorate even in a high temperature state (for example, 260° C.) during reflow soldering. In this point, the coin-shaped non-aqueous electrolyte secondary battery for reflow soldering disclosed in Patent Literature 3 (JP4392189B) exhibits some heat resistance to solder reflow but has poor constant voltage charge cycle performance, and thus a further improvement is desired. That is, a small and thin coin-shaped lithium secondary battery with high capacity and high output which can be charged at a constant voltage while having a heat resistance suitable for solder reflow has not been known so far.

The inventors have now found that a small and thin coin-shaped lithium secondary battery with high capacity and high output which can be charged at a constant voltage while having excellent heat resistance to enable reflow soldering can be provided by using a lithium complex oxide sintered plate as a positive electrode and a titanium-containing sintered plate as a negative electrode.

Accordingly, an object of the present invention is to provide a small and thin coin-shaped lithium secondary battery with high capacity and high output which can be charged at a constant voltage while having excellent heat resistance to enable reflow soldering.

According to an aspect of the present invention, there is provided a coin-shaped lithium secondary battery comprising:
- a positive electrode plate which is a lithium complex oxide sintered plate;
- a negative electrode plate which is a titanium-containing sintered plate;
- a separator interposed between the positive electrode plate and the negative electrode plate;
- an electrolytic solution with which the positive electrode plate, the negative electrode, and the separator are impregnated; and
- an exterior body comprising a closed space, the closed space accommodating the positive electrode plate, the negative electrode plate, the separator, and the electrolytic solution,
- the lithium secondary battery having a thickness of 0.7 to 1.6 mm and a diameter of 10 to 20 mm.

According to another aspect of the present invention, there is provided an IoT device comprising:
- a circuit board; and
- the coin-shaped lithium secondary battery.

DETAILED DESCRIPTION OF THE INVENTION

Coin-Shaped Lithium Secondary Battery

Figure 1:
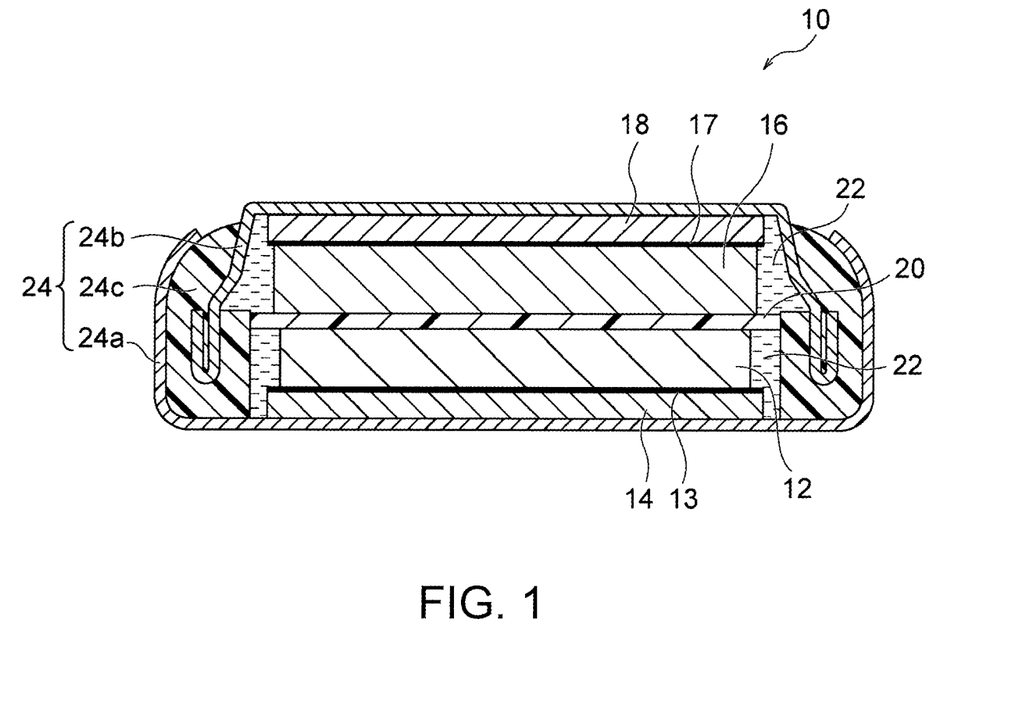
FIG. 1 is a schematic sectional view of an example of the coin-shaped lithium secondary battery of the present invention.

FIG. 1 schematically shows an example of the coin-shaped lithium secondary battery of the present invention. A lithium secondary battery 10 shown in FIG. 1 includes a positive electrode plate 12, a negative electrode plate 16, a separator 20, an electrolytic solution 22, and an exterior body 24. The positive electrode plate 12 is a lithium complex oxide sintered plate. The negative electrode plate 16 is a titanium-containing sintered plate. The separator 20 is interposed between the positive electrode plate 12 and the negative electrode plate 16. The positive electrode plate 12, the negative electrode plate 16, and the separator 20 are impregnated with the electrolytic solution 22. The exterior body 24 includes a closed space, and the closed space accommodates the positive electrode plate 12, the negative electrode plate 16, the separator 20, and the electrolytic solution 22. The lithium secondary battery 10 has a thickness of 0.7 to 1.6 mm and a diameter of 10 to 20 mm. In this way, a small and thin coin-shaped lithium secondary battery with high capacity and high output which can be charged at a constant voltage while having excellent heat resistance to enable reflow soldering can be provided by using a lithium complex oxide sintered plate as a positive electrode and a titanium-containing sintered plate as a negative electrode.

That is, with the spread of IoT devices in recent years, a small and thin coin-shaped lithium secondary battery with high capacity and high output which can be charged particularly at a constant voltage (CV) has been desired, as described above. Meanwhile, in order to efficiently produce IoT devices, it is desired to mount a coin-shaped lithium secondary battery on a circuit board by solder reflow, and therefore it is desired that the battery performance does not deteriorate even in a high temperature state (for example, 260° C.) during reflow soldering. In this point, the lithium secondary battery 10 of the present invention can sufficiently satisfy such requirements. In particular, employment of such respective predetermined sintered plates as a positive electrode and as a negative electrode enables not only heat resistance but also high capacity and high output, particularly, constant-voltage charging and high-speed charging to be achieved. Accordingly, the lithium secondary battery 10 of the present invention is preferably used as a battery for IoT devices, particularly, as a battery to be mounted on a circuit board by reflow soldering. That is, another preferable aspect of the present invention provides an IoT device including a circuit board and a coin-shaped lithium secondary battery. More preferably, an IoT device with a coin-shaped lithium secondary battery mounted on a circuit board by reflow soldering is provided. In this description, the term "IoT" is an abbreviation for Internet of Things, and the "IoT device" means any device connected to the Internet to exhibit specific functions.

As described above, the lithium secondary battery 10 is a small and thin coin-shaped lithium secondary battery with high capacity, that is, high energy density. Specifically, the lithium secondary battery 10 has a thickness of 0.7 to 1.6 mm, preferably 0.8 to 1.6 mm, more preferably 0.9 to 1.4 mm, further preferably 1.0 to 1.2 mm. The lithium secondary battery 10 has a diameter of 10 to 20 mm, preferably 10 to 18 mm, more preferably 11 to 16 mm, further preferably 12 to 14 mm. The lithium secondary battery 10 preferably has an energy density of 35 to 200 mWh/cm$^3$, more preferably 40 to 200 mWh/cm$^3$, further preferably 50 to 200 mWh/cm$^3$. The lithium secondary battery 10 preferably has a battery capacity of 1.8 to 45 mAh, more preferably 2.3 to 45 mAh, further preferably 4.5 to 20 mAh. The value obtained by dividing the battery capacity of the lithium secondary battery 10 by the thickness of the positive electrode plate 12 is preferably 1.8 to 28.1 mAh/mm, more preferably 3.5 to 17 mAh/mm, further preferably 5 to 8 mAh/mm. The specifications within such ranges are extremely advantageous to be incorporated in a device that can be comparatively small such as an IoT device.

The positive electrode plate 12 is a lithium complex oxide sintered plate. The fact that the positive electrode plate 12 is a sintered plate means that the positive electrode plate 12 contains no binder or conductive agent. This is because, even if a binder is contained in a green sheet, the binder disappears or burns out during firing. Then, since the positive electrode plate 12 contains no binder, there is an advantage that deterioration of the positive electrode due to the electrolytic solution 22 can be avoided. The lithium complex oxide constituting the sintered plate is particularly preferably lithium cobaltate (typically, LiCoO$_2$ (which will be hereinafter abbreviated as LCO)). Various lithium complex oxide sintered plates or LCO sintered plates are known, and those disclosed in Patent Literature 4 (JP5587052B) and Patent Literature 5 (WO2017/146088) can be used, for example.

Figure 2:
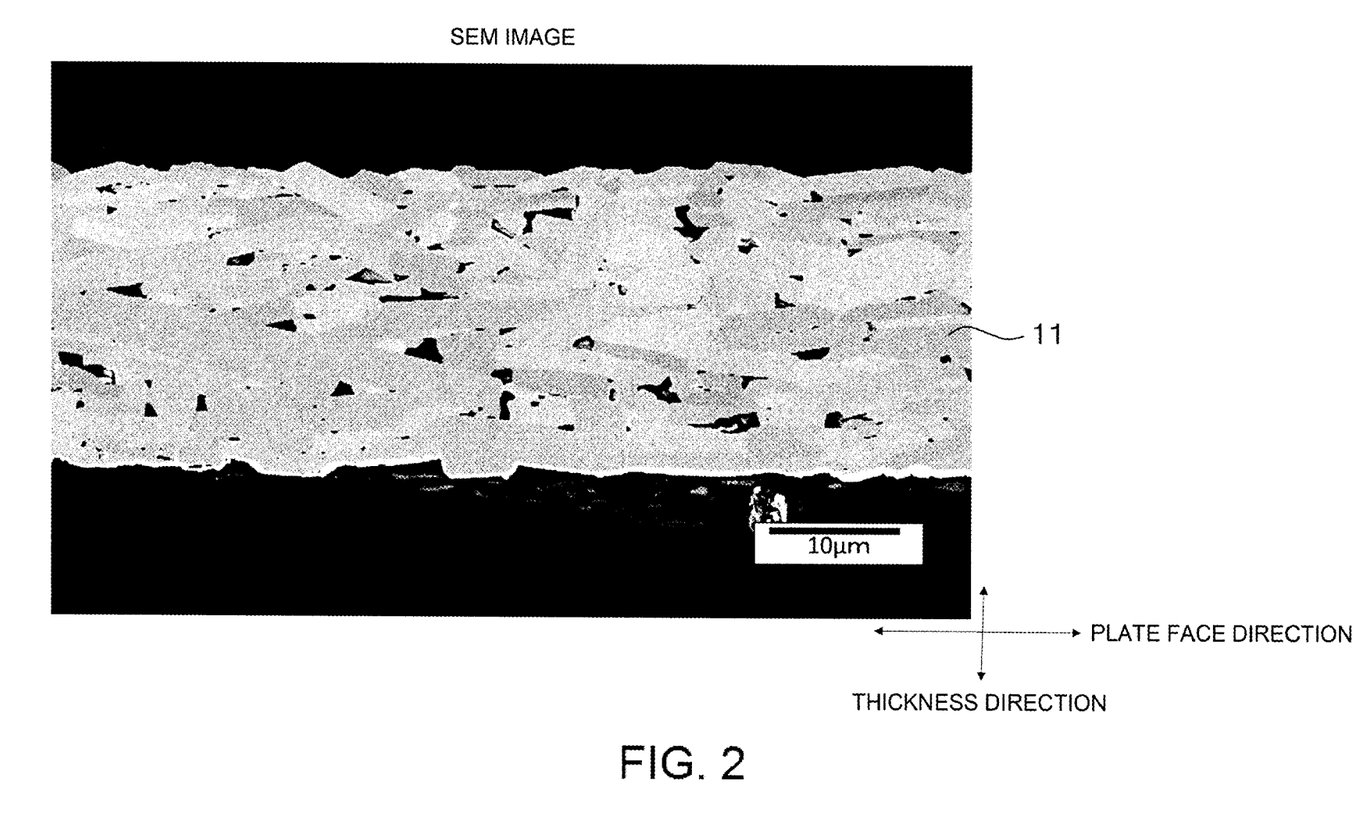
FIG. 2 is a SEM image showing an example of a cross section perpendicular to the plate face of an oriented positive electrode plate.
Figure 3:
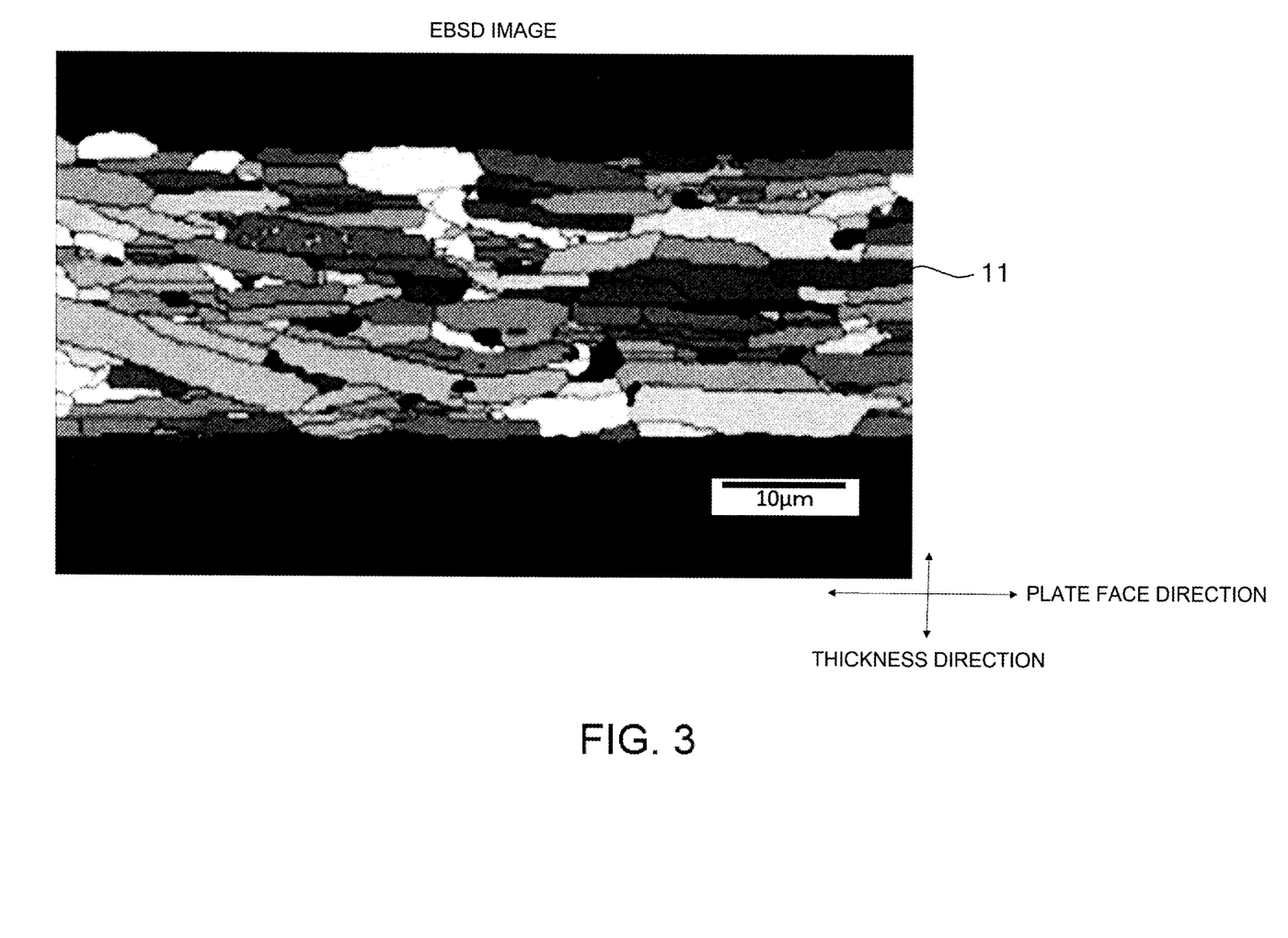
FIG. 3 is an EBSD image in the cross section of the oriented positive electrode plate shown in FIG. 2.
Figure 4:
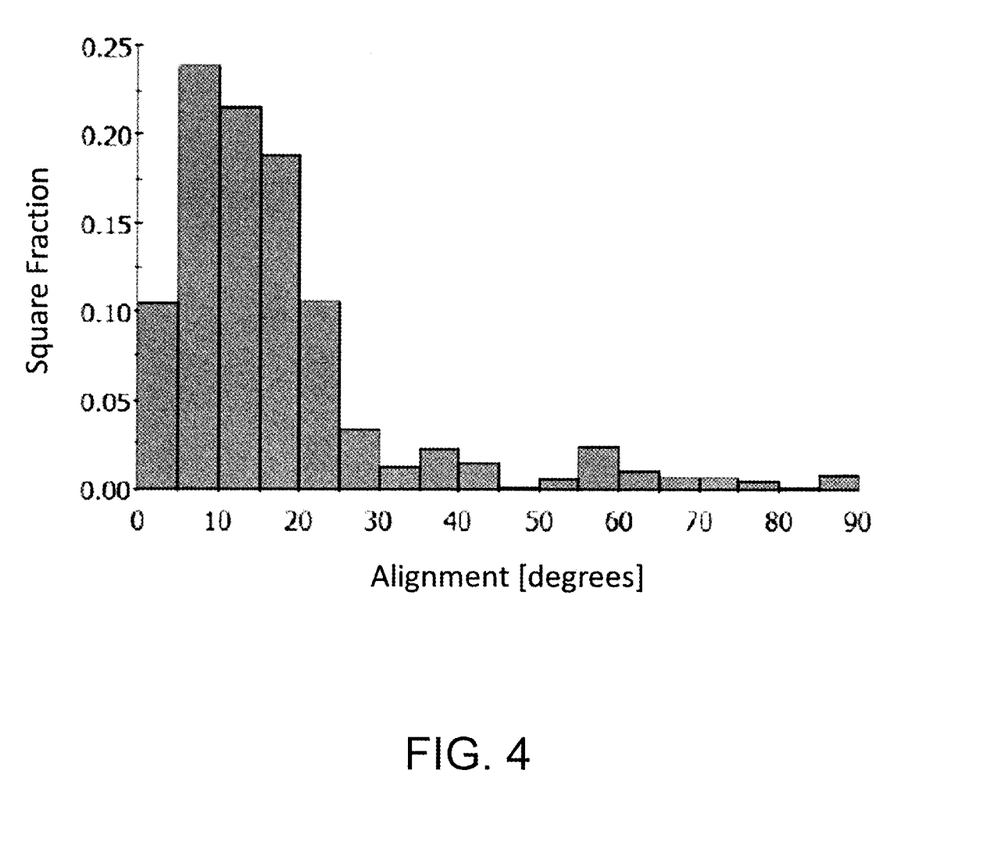
FIG. 4 is an area-based histogram showing the distribution of orientation angles of primary grains in the EBSD image shown in FIG. 3.

According to a preferable aspect of the present invention, the positive electrode plate 12, that is, the lithium complex oxide sintered plate is an oriented positive electrode plate including a plurality of primary grains composed of lithium complex oxide, the plurality of primary grains being oriented at an average orientation angle of over 0° and 30° or less to the plate face of the positive electrode plate. FIG. 2 shows an example of a SEM image in a cross section perpendicular to the plate face of the oriented positive electrode plate 12, and FIG. 3 shows an electron backscatter diffraction (EBSD: Electron Backscatter Diffraction) image in a cross section perpendicular to the plate face of the oriented positive electrode plate 12. Further, FIG. 4 shows an area-based histogram showing the distribution of orientation angles of primary grains 11 in the EBSD image shown in FIG. 3. In the EBSD image shown in FIG. 3, the discontinuity of crystal orientation can be observed. In FIG. 3, the orientation angle of each primary grain 11 is indicated by the shading of color. A darker color indicates a smaller orientation angle. The orientation angle is a tilt angle formed by plane (003) of the primary grains 11 to the plate face direction. In FIGS. 2 and 3, the points shown in black within the oriented positive electrode plate 12 represent pores.

The oriented positive electrode plate 12 is an oriented sintered body composed of the plurality of primary grains 11 bound to each other. The primary grains 11 are each mainly in the form of a plate but may include rectangular, cubic, and spherical grains. The cross-sectional shape of each primary grain 11 is not particularly limited and may be a rectangular shape, a polygonal shape other than the rectangular shape, a circular shape, an elliptical shape, or a complex shape other than above.

The primary grains 11 are composed of a lithium complex oxide. The lithium complex oxide is an oxide represented by $Li_xMO_2$ (where $0.05<x<1.10$ is satisfied, M represents at least one transition metal, and M typically contains one or more of Co, Ni, and Mn). The lithium complex oxide has a layered rock-salt structure. The layered rock-salt structure refers to a crystalline structure in which lithium layers and transition metal layers other than lithium are alternately stacked with oxygen layers interposed therebetween, that is, a crystalline structure in which transition metal ion layers and single lithium layers are alternately stacked with oxide ions therebetween (typically, an $\alpha$-$NaFeO_2$ structure, i.e., a cubic rock-salt structure in which transition metal and lithium are regularly disposed in the [111] axis direction). Examples of the lithium complex oxide include $Li_xCoO_2$ (lithium cobaltate), $Li_xNiO_2$ (lithium nickelate), $Li_xMnO_2$ (lithium manganate), $Li_xNiMnO_2$ (lithium nickel manganate), $Li_xNiCoO_2$ (lithium nickel cobaltate), $Li_xCoNiMnO_2$ (lithium cobalt nickel manganate), and $Li_xCoMnO_2$ (lithium cobalt manganate), particularly preferably $Li_xCoO_2$ (lithium cobaltate, typically $LiCoO_2$). The lithium complex oxide may contain one or more elements selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W.

As shown in FIGS. 3 and 4, the average of the orientation angles of the primary grains 11, that is, the average orientation angle is over 0° and 30° or less. This brings various advantages as follows. First, since each primary grain 11 lies in a direction inclined from the thickness direction, the adhesion between the primary grains can be improved. As a result, the lithium ion conductivity between a certain primary grain 11 and each of other primary grains 11 adjacent to the primary grain 11 on both sides in the longitudinal direction can be improved, so that the rate characteristic can be improved. Secondly, the rate characteristic can be further improved. This is because, when lithium ions move in and out, the oriented positive electrode plate 12 expands and contracts smoothly since the oriented positive electrode plate 12 expands and contracts more in the thickness direction than in the plate face direction, as described above, and thus the lithium ions also move in and out smoothly.

The average orientation angle of the primary grains 11 is obtained by the following method. First, three horizontal lines that divide the oriented positive electrode plate 12 into four equal parts in the thickness direction and three vertical lines that divide the oriented positive electrode plate 12 into four equal parts in the plate face direction are drawn in an EBSD image of a rectangular region of 95 µm×125 µm observed at a magnification of 1000 times, as shown in FIG. 3. Next, the average orientation angle of the primary grains 11 is obtained by arithmetically averaging the orientation angles of all the primary grains 11 intersecting at least one of the three horizontal lines and the three vertical lines. The average orientation angle of the primary grains 11 is preferably 30° or less, more preferably 25° or less, from the viewpoint of further improving the rate characteristics. From the viewpoint of further improving the rate characteristics, the average orientation angle of the primary grains 11 is preferably 2° or more, more preferably 5° or more.

As shown in FIG. 4, the orientation angles of the primary grains 11 may be widely distributed from 0° to 90°, but most of them are preferably distributed in the region of over 0° and 30° or less. That is, when a cross section of the oriented sintered body constituting the oriented positive electrode plate 12 is analyzed by EBSD, the total area of the primary grains 11 with an orientation angle of over 0° and 30° or less to the plate face of the oriented positive electrode plate 12 (which will be hereinafter referred to as low-angle primary grains) out of the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Thereby, the proportion of the primary grains 11 with high mutual adhesion can be increased, so that the rate characteristic can be further improved. Further, the total area of grains with an orientation angle of 20° or less among the low-angle primary grains is more preferably 50% or more with respect to the total area of 30 primary grains 11 used for calculating the average orientation angle. Further, the total area of grains with an orientation angle of 10° or less among the low-angle primary grains is more preferably 15% or more with respect to the total area of 30 primary grains 11 used for calculating the average orientation angle.

Since the primary grains 11 are each mainly in the form of a plate, the cross section of each primary grain 11 extends in a predetermined direction, typically in a substantially rectangular shape, as shown in FIGS. 2 and 3. That is, when the cross section of the oriented sintered body is analyzed by EBSD, the total area of the primary grains 11 with an aspect ratio of 4 or more in the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Specifically, in the EBSD image as shown in FIG. 3, the mutual adhesion between the primary grains 11 can be further improved by above, as a result of which the rate characteristic can be further improved. The aspect ratio of each primary grain 11 is a value obtained by dividing the maximum Feret diameter of the primary grain 11 by the minimum Feret diameter. The maximum Feret diameter is the maximum distance between two parallel straight lines that interpose the primary grain 11 therebetween on the EBSD image in observation of the cross section. The minimum Feret diameter is the minimum distance between two parallel straight lines that interpose the primary grain 11 therebetween on the EBSD image.

The mean diameter of the plurality of primary grains constituting the oriented sintered body is preferably 5 µm or more. Specifically, the mean diameter of the 30 primary grains 11 used for calculating the average orientation angle is preferably 5 µm or more, more preferably 7 µm or more, further preferably 12 µm or more. Thereby, since the number of grain boundaries between the primary grains 11 in the direction in which lithium ions conduct is reduced, and the lithium ion conductivity as a whole is improved, the rate characteristic can be further improved. The mean diameter of the primary grains 11 is a value obtained by arithmetically averaging the equivalent circle diameters of the primary grains 11. An equivalent circle diameter is the diameter of a circle having the same area as each primary grain 11 on the EBSD image.

The positive electrode plate 12 preferably includes pores. The electrolytic solution can penetrate into the sintered body by the sintered body including pores, particularly open pores, when the sintered body is integrated into a battery as a positive electrode plate. As a result, the lithium ion conductivity can be improved. This is because there are two types of conduction of lithium ions within the sintered body: conduction through constituent grains of the sintered body; and conduction through the electrolytic solution within the pores, and the conduction through the electrolytic solution within the pores is overwhelmingly faster.

The positive electrode plate 12, that is, the lithium complex oxide sintered plate preferably has a porosity of 20 to 60%, more preferably 25 to 55%, further preferably 30 to 50%, particularly preferably 30 to 45%. The stress relief effect by the pores and the increase in capacity can be expected, and the mutual adhesion between the primary grains 11 can be further improved, so that the rate characteristics can be further improved. The porosity of the sintered body is calculated by polishing a cross section of the positive electrode plate with CP (cross-section polisher) polishing, thereafter observing the cross section at a magnification of 1000 times with SEM, and binarizing the SEM image obtained. The average equivalent circle diameter of pores formed inside the oriented sintered body is not particularly limited but is preferably 8 µm or less. The smaller the average equivalent circle diameter of the pores, the mutual adhesion between the primary grains 11 can be improved more. As a result, the rate characteristic can be improved more. The average equivalent circle diameter of the pores is a value obtained by arithmetically averaging the equivalent circle diameters of 10 pores on the EBSD image. An equivalent circle diameter is the diameter of a circle having the same area as each pore on the EBSD image. Each of the pores formed inside the oriented sintered body is preferably an open pore connected to the outside of the positive electrode plate 12.

The positive electrode plate 12, that is, the lithium complex oxide sintered plate preferably has a mean pore diameter of 0.1 to 10.0 µm, more preferably 0.2 to 5.0 µm, further preferably 0.3 to 3.0 µm. Within such a range, stress concentration is suppressed from occurring locally in large pores, and the stress is easily released uniformly in the sintered body.

The positive electrode plate 12 preferably has a thickness of 60 to 450 µm, more preferably 70 to 350 µm, further preferably 90 to 300 µm. The thickness within such a range can improve the energy density of the lithium secondary battery 10 by increasing the capacity of the active material per unit area together with suppressing the deterioration of the battery characteristics (particularly, the increase of the resistance value) due to repeated charging/discharging.

The negative electrode plate 16 is a titanium-containing sintered plate. The titanium-containing sintered plate preferably contains lithium titanate $Li_4Ti_5O_{12}$ (which will be hereinafter referred to as LTO) or niobium titanium complex oxide $Nb_2TiO_7$, more preferably contains LTO. LTO is typically known to have a spinel structure but can have other structures during charging and discharging. For example, the reaction of LTO proceeds in the two-phase coexistence of $Li_4Ti_5O_{12}$ (spinel structure) and $Li_7Ti_5O_{12}$ (rock salt structure) during charging and discharging. Accordingly, the structure of LTO is not limited to the spinel structure.

The fact that the negative electrode plate 16 is a sintered plate means that the negative electrode plate 16 contains no binder or conductive agent. This is because, even if a binder is contained in a green sheet, the binder disappears or burns out during firing. Since the negative electrode plate contains no binder, high capacity and good charge/discharge efficiency can be achieved by high packing density of the negative electrode active material (for example, LTO or $Nb_2TiO_7$). The LTO sintered plate can be produced according to the method described in Patent Literature 6 (JP2015-185337A).

The negative electrode plate 16, that is, the titanium-containing sintered plate has a structure that a plurality (namely, a large number) of primary grains are bonded. Accordingly, these primary grains are preferably composed of LTO or $Nb_2TiO_7$.

The negative electrode plate 16 preferably has a thickness of 70 to 500 µm, preferably 85 to 400 µm, more preferably 95 to 350 µm. The larger the thickness of the LTO sintered plate, a battery with high capacity and high energy density is achieved more easily. The thickness of the negative electrode plate 16 is determined by measuring the distance between the two substantially parallel faces of the plate, for example, when the cross section of the negative electrode plate 16 is observed by SEM (scanning electron microscopy).

The primary grain size that is the average grain size of the plurality of primary grains forming the negative electrode plate 16 is preferably 1.2 µm or less, more preferably 0.02 to 1.2 µm, further preferably 0.05 to 0.7 µm. Within such a range, the lithium ion conductivity and the electron conductivity are easily compatible with each other, which contributes to improving the rate performance.

The negative electrode plate 16 preferably contains pores. The electrolytic solution can penetrate into the sintered plate by the sintered plate including pores, particularly open pores, when the sintered plate is integrated into a battery as a negative electrode plate. As a result, the lithium ion conductivity can be improved. This is because there are two types of conduction of lithium ions within the sintered body: conduction through constituent grains of the sintered body; and conduction through the electrolytic solution within the pores, and the conduction through the electrolytic solution within the pores is overwhelmingly faster.

The negative electrode plate 16 preferably has a porosity of 20 to 60%, more preferably 30 to 55%, further preferably 35 to 50%. Within such a range, the lithium ion conductivity and the electron conductivity are easily compatible with each other, which contributes to improving the rate performance.

The negative electrode plate 16 has a mean pore diameter of 0.08 to 5.0 µm, preferably 0.1 to 3.0 µm, more preferably 0.12 to 1.5 µm. Within such a range, the lithium ion conductivity and the electron conductivity are easily compatible with each other, which contributes to improving the rate performance.

Preferable examples of the separator 20 include separators made of cellulose, polyolefin, polyimide, polyester (e.g., polyethylene terephthalate (PET)), or ceramics. Separators made of cellulose are advantageous in that they are inexpensive and have excellent heat resistance. Unlike widely used separators made of polyolefin with poor heat resistance, separators made of polyimide, polyester (e.g., polyethylene terephthalate (PET)), or cellulose themselves have not only excellent heat resistance, but also the component of the electrolytic liquid, γ-butyrolactone (GBL), having excellent heat resistance exhibits excellent wettability thereon. Accordingly, in the case of using an electrolytic solution containing GBL, the electrolytic solution can sufficiently penetrate into the separator (without repelling). Meanwhile, separators made of ceramics are advantageous in that they, of course, have excellent heat resistance and can be produced as one integrated sintered body together with the positive electrode plate 12 and the negative electrode plate 16 as a whole. In the case of using a ceramic separator, the ceramic forming the separator is preferably at least one selected from MgO, $Al_2O_3$, $ZrO_2$, SiC, $Si_3N_4$, AlN, and cordierite, more preferably at least one selected from MgO, $Al_2O_3$, and $ZrO_2$.

The electrolytic solution 22 is not specifically limited, and commercially available electrolytic solutions for lithium batteries such as a solution in which a lithium salt is dissolved in a non-aqueous solvent such as an organic solvent may be used. In particular, an electrolytic solution having excellent heat resistance is preferable, and such an electrolytic solution preferably contains lithium borofluoride ($LiBF_4$) in a non-aqueous solvent. In this case, the non-aqueous solvent is preferably at least one selected from the group consisting of γ-butyrolactone (GBL), ethylene carbonate (EC) and propylene carbonate (PC), more preferably a mixed solvent composed of EC and GBL, a single solvent composed of PC, a mixed solvent composed of PC and GBL, or a single solvent composed of GBL, particularly preferably a mixed solvent composed of EC and GBL or a single solvent composed of GBL. The non-aqueous solvent has an increased boiling point by containing γ-butyrolactone (GBL), which considerably improves the heat resistance. From such a viewpoint, the volume ratio of EC:GBL in the EC and/or GBL containing non-aqueous solvent is preferably 0:1 to 1:1 (GBL ratio: 50 to 100% by volume), more preferably 0:1 to 1:1.5 (GBL ratio: 60 to 100% by volume), further preferably 0:1 to 1:2 (GBL ratio: 66.6 to 100% by volume), particularly preferably 0:1 to 1:3 (GBL ratio: 75 to 100% by volume). The lithium borofluoride ($LiBF_4$) to be dissolved in the non-aqueous solvent is an electrolyte having a high decomposition temperature, which also considerably improves the heat resistance. The $LiBF_4$ concentration in the electrolytic solution 22 is preferably 0.5 to 2 mol/L, more preferably 0.6 to 1.9 mol/L, further preferably 0.7 to 1.7 mol/L, particularly preferably 0.8 to 1.5 mol/L.

The electrolytic solution 22 may further contain vinylene carbonate (VC) and/or fluoroethylene carbonate (FEC) and/or vinyl ethylene carbonate (VEC) as additives. Both VC and FEC have excellent heat resistance. Accordingly, a SEI film having excellent heat resistance can be formed on the surface of the negative electrode plate 16 by the electrolytic solution 22 containing such additives.

The exterior body 24 includes a closed space, and the closed space accommodates the positive electrode plate 12, the negative electrode plate 16, the separator 20, and the electrolytic solution 22. A structure generally employed for coin-shaped batteries (for example, see Patent Literature 1) may be employed as the exterior body 24, and there is no specific limitation. Typically, the exterior body 24 includes a positive electrode can 24a, a negative electrode can 24b, and a gasket 24c, and the positive electrode can 24a and the negative electrode can 24b are crimped via the gasket 24c to form the closed space. The positive electrode can 24a and the negative electrode can 24b can be made of metals such as stainless steel and are not specifically limited. The gasket 24c can be an annular member made of an insulating resin such as polypropylene or polytetrafluoroethylene and is not specifically limited.

The lithium secondary battery 10 preferably further includes a positive electrode current collector 14 and/or a negative electrode current collector 18. The positive electrode current collector 14 and the negative electrode current collector 18 are not specifically limited but are preferably metal foils such as copper foils and aluminum foils. The positive electrode current collector 14 is preferably interposed between the positive electrode plate 12 and the positive electrode can 24a, and the negative electrode current collector 18 is preferably interposed between the negative electrode plate 16 and the negative electrode can 24b. Further, a positive side carbon layer 13 is preferably provided between the positive electrode plate 12 and the positive electrode current collector 14 for reducing the contact resistance. Likewise, a negative side carbon layer 17 is preferably provided between the negative electrode plate 16 and the negative electrode current collector 18 for reducing the contact resistance. Both the positive side carbon layer 13 and the negative side carbon layer 17 are preferably composed of a conductive carbon and may be formed, for example, by applying a conductive carbon paste by screen printing or the like.

Method for Producing Positive Electrode Plate

The positive electrode plate 12, that is, the lithium complex oxide sintered plate may be produced by any method and is preferably produced through (a) preparation of a green sheet containing a lithium complex oxide, (b) preparation of a green sheet containing an excess-lithium source, as required, and (c) laminating and firing of the green sheets.

(a) Preparation of Green Sheet Containing Lithium Complex Oxide

A raw material powder composed of lithium complex oxide is prepared. The powder preferably comprises pre-synthesized platy particles (e.g., $LiCoO_2$ platy particles) having a composition of $LiMO_2$ (M as described above). The volume-based D50 particle diameter of the raw material powder is preferably 0.3 to 30 µm. For example, the $LiCoO_2$ platy particles can be produced as follows. $Co_3O_4$ powder and $Li_2CO_3$ powder as raw materials are mixed and fired (500 to 900° C., 1 to 20 hours) to synthesize $LiCoO_2$ powder. The resultant $LiCoO_2$ powder is milled into a volume-based D50 particle diameter of 0.2 µm to 10 µm with a pot mill to yield platy $LiCoO_2$ particles capable of conducting lithium ions along the faces of the plate. Such $LiCoO_2$ particles are also produced by a procedure involving grain growth in a green sheet from $LiCoO_2$ powder slurry and crushing the green sheet, or a procedure involving synthesis of platy crystals, such as a flux process, a hydrothermal synthesis process, a single crystal growth process using a melt, and a sol gel process. The resultant $LiCoO_2$ particles are readily cleaved along cleavage planes. The LiCoO$_2$ particles may be cleaved by crushing to produce LiCoO$_2$ platy particles.

The platy particles may be independently used as raw material powder, or a mixed powder of the platy powder and another raw material powder (for example, Co$_3$O$_4$ particles) may be used as a raw material powder. In the latter case, it is preferred that the platy powder serves as template particles for providing orientation, and another raw material powder (e.g., Co$_3$O$_4$ particles) serves as matrix particles that can grow along the template particle. In this case, the raw powder is preferably composed of a mixed powder in a ratio of template particles to matrix particles of 100:0 to 3:97. When the Co$_3$O$_4$ raw material powder is used as the matrix particles, the volume-based D50 particle diameter of the Co$_3$O$_4$ raw material powder may be any value, for example, 0.1 to 1.0 μm, and is preferably smaller than the volume-based D50 particle diameter of LiCoO$_2$ template particles. The matrix particles may also be produced by heating a Co(OH)$_2$ raw material at 500° C. to 800° C. for 1 to 10 hours. In addition to Co$_3$O$_4$, Co(OH)$_2$ particles may be used, or LiCoO$_2$ particles may be used as the matrix particles.

When the raw material powder is composed of 100% of LiCoO$_2$ template particles, or when LiCoO$_2$ particles are used as matrix particles, a large (e.g., 90 mm×90 mm square) flat LiCoO$_2$ sintered plate can be yielded by firing. Although the mechanism is not clear, since synthesis of LiCoO$_2$ does not proceed in a firing process, a change in volume or local unevenness of the shape probably does not occur.

The raw material powder is mixed with a dispersive medium and any additive (e.g., binder, plasticizer, and dispersant) to form a slurry. A lithium compound (e.g., lithium carbonate) in an excess amount of about 0.5 to 30 mol % other than LiMO$_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is formed into a sheet to give a green sheet containing lithium complex oxide. The resultant green sheet is in a form of independent sheet. An independent sheet (also referred to as a "self-supported film") refers to a sheet (including flakes having an aspect ratio of 5 or more) that can be handled in a singular form independently apart from a support that is different therefrom. In other words, the independent sheet does not refer to a sheet that is fixed to a support that is different therefrom (such as a substrate) and integrated with the support (so as to be inseparable or hard to separate). The sheet is preferably formed by a forming procedure capable of applying a shear force to platy particles (for example, template particles) in the raw material powder. Through this process, the primary grains can have a mean tilt angle of over than 0° to 30° or less to the plate face. The forming procedure capable of applying a shear force to platy particles suitably includes a doctor blade process. The thickness of the green sheet containing the lithium complex oxide may be appropriately selected so as to give the above desired thickness after firing.

(b) Preparation of Green Sheet Containing Excess-Lithium Source (Optional Step)

Besides the above green sheet containing lithium complex oxide, another green sheet containing an excess-lithium source is then prepared, if desired. The excess-lithium source is preferably a lithium compound other than LiMO$_2$. The components other than Li in the compound evaporate during firing. A preferred example of such a lithium compound (an excess-lithium source) is lithium carbonate. The excess-lithium source is preferably powder, and has a volume-based D50 particle diameter of preferably 0.1 to 20 μm, more preferably 0.3 to 10 μm. The lithium source powder is mixed with a dispersive medium and additives (e.g., a binder, a plasticizer, and a dispersant) to form a slurry. The resultant slurry is defoamed by stirring under reduced pressure, and the viscosity is preferably adjusted into 1000 to 20000 cP. The resultant slurry is formed into a green sheet containing an excess-lithium source. The resultant green sheet is also in a form of independent sheet. The sheet can be formed by any known process and is preferably formed by a doctor blade process. The thickness of the green sheet containing the excess-lithium source is appropriately selected, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

(c) Lamination and Firing of Green Sheets

The green sheet containing the lithium complex oxide (e.g., LiCoO$_2$ green sheet) and the green sheet containing the excess-lithium source (e.g., Li$_2$CO$_3$ green sheet), if desired, are sequentially disposed on a bottom setter, and a top setter is disposed on the green sheets. The top and bottom setters are made of ceramic, preferably zirconia or magnesia. If the setters are made of magnesia, the pores tend to get smaller. The top setter may have a porous structure, a honeycomb structure, or a dense structure. If the top setter has a dense structure, the pores in the sintered plate readily get smaller, and the number of pores tends to get larger. As necessary, the green sheet containing the excess-lithium source is preferably cut into a size, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

After the green sheet containing the lithium complex oxide (e.g., a LiCoO$_2$ green sheet) is placed on the bottom setter, the green sheet may be optionally degreased and then calcined at 600 to 850° C. for 1 to 10 hours. In this step, the green sheet containing the excess-lithium source (e.g., a Li$_2$CO$_3$ green sheet) and the top setter may be sequentially disposed on the resultant calcined plate.

The green sheets and/or the calcined plate disposed between the setters are optionally degreased and heated (fired) in a medium temperature range (e.g., 700 to 1000° C.) to give a lithium complex oxide sintered plate. This firing process may be performed in one or two steps. In the case of firing in two separate steps, the temperature in the first firing step is preferably lower than that in the second firing step. The resultant sintered plate is also in a form of independent sheet.

Method for Producing Negative Electrode Plate

The negative electrode plate 16, that is, the titanium-containing sintered plate may be produced by any method. For example, the LTO sintered plate is preferably produced by (a) preparation of a LTO-containing green sheet and (b) firing of the LTO-containing green sheet.

(a) Preparation of LTO-Containing Green Sheet

First, raw material powder (LTO powder) composed of lithium titanate Li$_4$Ti$_5$O$_{12}$ is prepared. Commercially available or newly synthesized LTO powder may be used as the raw material powder. For example, powder obtained by hydrolyzing a mixture of titanium tetraisopropoxy alcohol and isopropoxy lithium may be used, or a mixture containing lithium carbonate, titania, or the like may be fired. The raw material powder preferably has a volume-based D50 particle size of 0.05 to 5.0 μm, more preferably 0.1 to 2.0 μm. A larger particle size of the raw material powder tends to increase the size of the pores. Further, in the case where the particle size of the raw material is large, milling (such as pot milling, bead milling, and jet milling) may be performed to a desired particle size. The raw material powder is mixed with a dispersive medium and any additive (e.g., binder, plasticizer, and dispersant) to form a slurry. A lithium compound (e.g., lithium carbonate) in an excess amount of about 0.5 to 30 mol % other than $LiMO_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is formed into a LTO-containing green sheet. The resultant green sheet is in a form of independent sheet. An independent sheet (also referred to as a "self-supported film") refers to a sheet (including flakes having an aspect ratio of 5 or more) that can be handled in a singular form independently apart from a support that is different therefrom. In other words, the independent sheet does not refer to a sheet that is fixed to a support that is different therefrom (such as a substrate) and integrated with the support (so as to be inseparable or hard to separate). The sheet can be formed by any known process and is preferably formed by a doctor blade process. The thickness of the LTO-containing green sheet may be appropriately selected so as to give the above desired thickness after firing.

(b) Firing of LTO-Containing Green Sheet

The LTO-containing green sheet is disposed on a setter. The setter is made of ceramics, preferably zirconia or magnesia. The setter is preferably embossed. The green sheet disposed on the setter is put into a sheath. The sheath is made of ceramics, preferably alumina. Then, the green sheet in this state degreased, as needed, and fired to obtain a LTO sintered plate. The firing is preferably performed at 600 to 900° C. for 1 to 50 hours, more preferably at 700 to 800° C. for 3 to 20 hours. The resultant sintered plate is also in a form of independent sheet. The heating rate during firing is preferably 100 to 1000° C./h, more preferably 100 to 600° C./h. In particular, this heating rate is preferably employed in a temperature rising process from 300° C. to 800° C., more preferably from 400° C. to 800° C.

(c) Summary

As described above, a LTO sintered plate can be preferably produced. In this preferable production method, it is effective 1) to adjust the particle size distribution of the LTO powder and/or 2) to change the heating rate during firing, and these are considered to contribute to achieving various properties of the LTO sintered plate.

EXAMPLES

The invention will be illustrated in more detail by the following examples. In the following examples, $LiCoO_2$ will be abbreviated as "LCO", and $Li_4Ti_5O_{12}$ will be abbreviated as "LTO".

Example 1

(1) Production of Positive Electrode Plate
(1a) Preparation of LCO green sheet
As shown in Table 1, LCO raw material powder was prepared and was named powder A. The resultant LCO powder A (100 parts by weight), a dispersive medium (toluene:2-propanol=1:1) (100 parts by weight), a binder (polyvinyl butyral: Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-O30, manufactured by Kao Corporation) (2 parts by weight) were mixed. The resultant mixture was defoamed by stirring under reduced pressure to prepare an LCO slurry with a viscosity of 4000 cP. The viscosity was measured with an LVT viscometer manufactured by Brookfield. The slurry prepared was formed into an LCO green sheet onto a PET film by a doctor blade process. The dried thickness of the LCO green sheet was 240 μm.

(1b) Preparation of LCO Sintered Plate

The LCO green sheet was separated from the PET film, and was cut into a 50 mm square. The cut piece was placed on the center of a bottom magnesia setter (dimensions: 90 mm square, height: 1 mm). A porous magnesia setter as the top setter was placed on the LCO sheet. The LCO sheet disposed between the setters was placed into an alumina sheath of a 120 mm square (manufactured by Nikkato Co., Ltd.). At this time, the alumina sheath was not tightly sealed, and was covered with a lid with a gap of 0.5 mm. The stack obtained was heated to 600° C. at a heating rate of 200° C./h and degreased for 3 hours, then heated to 820° C. at 200° C./h, and held for 20 hours for firing. After the firing, the fired laminate was cooled to room temperature, and was removed from the alumina sheath. Thus, the LCO sintered plate with a thickness of 220 μm was yielded as a positive electrode plate. The positive electrode plate obtained was cut into a circular shape with a diameter of 10 mm using a laser processing machine, to obtain a positive electrode plate.

(2) Production of Negative Electrode Plate
(2a) Preparation of LTO Green Sheet
First, LTO powder (volume-based D50 particle size 0.06 μm, manufactured by Sigma-Aldrich Japan) (100 parts by weight), a dispersion medium (toluene:isopropanol=1:1) (100 parts by weight), a binder (polyvinyl butyral: Product No. BM-2, manufactured by SEKISUI CHEMICAL CO., LTD.) (20 parts by weight), a plasticizer (DOP: Di(2-ethylhexyl)phthalate, manufactured by Kurogane Kasei Co., Ltd.) (4 parts by weight), and a dispersant (product name: RHEODOL SP-O30, manufactured by Kao Corporation) (2 parts by weight) were mixed. The resultant negative electrode raw material mixture was defoamed by stirring under reduced pressure to prepare a LTO slurry with a viscosity of 4000 cP. The viscosity was measured with an LVT viscometer manufactured by Brookfield. The slurry prepared was formed into a LTO green sheet onto a PET film by a doctor blade process. The thickness of the LTO green sheet after drying and firing was adjusted to 250 μm.

(2b) Firing of LTO Green Sheet

The green sheet obtained was cut out into a 25-mm square with a cutter knife and disposed on an embossed zirconia setter. The green sheet on the setter was put into an alumina sheath and kept at 500° C. for 5 hours. Thereafter, the temperature was raised at a heating rate of 200° C./h, to perform firing at 765° C. for 5 hours. The LTO sintered plate obtained was cut into a circular shape with a diameter of 10.5 mm using a laser processing machine, to obtain a negative electrode plate.

(3) Production of Coin-Shaped Lithium Secondary Battery

The coin-shaped lithium secondary battery 10 as schematically shown in FIG. 1 was produced as follows.
(3a) Adhesion of negative electrode plate and negative electrode current collector with conductive carbon paste Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil as a negative electrode current collector. The negative electrode plate produced in (2) above was disposed within an undried printing pattern (that is, a region coated with the conductive carbon paste), followed by vacuum drying at 60° C. for 30 minutes, to produce a negative electrode structure with the negative electrode plate and the negative electrode current collector bonded via a carbon layer. The carbon layer had a thickness of 10 μm.

(3b) Preparation of Positive Electrode Current Collector with Carbon Layer

Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil as a positive electrode current collector, followed by vacuum drying at 60° C. for 30 minutes, to produce a positive electrode current collector with a carbon layer formed on a surface. The carbon layer had a thickness of 5 μm.

(3c) Assembling of Coin-Shaped Battery

The positive electrode current collector, the carbon layer, the LCO positive electrode plate, a cellulose separator, the LTO negative electrode plate, the carbon layer, and the negative electrode current collector were accommodated between the positive electrode can and the negative electrode can, which would form a battery case, so as to be stacked in this order from the positive electrode can toward the negative electrode can, and an electrolytic solution was filled therein. Thereafter, the positive electrode can and the negative electrode can were crimped via a gasket to be sealed. Thus, the coin cell-shaped lithium secondary battery 10 with a diameter of 12 mm and a thickness of 1.0 mm was produced. At this time, the electrolytic solution was a solution of $LiBF_4$ (1.5 mol/L) in a mixed organic solvent of ethylene carbonate (EC) and γ-butyrolactone (GBL) at 1:3.

(4) Evaluation

The LCO sintered plate (positive electrode plate) prepared in Procedure (1 b), the LTO sintered plate (negative electrode plate) prepared in Procedure (2b), and the coin-shaped lithium secondary battery manufactured in Procedure (3) were evaluated for various properties as shown below.

<Average Orientation Angle of Primary Grains>

The LCO sintered plate was polished with a cross section polisher (CP) (IB-15000CP, manufactured by JEOL Ltd.), and the resultant cross-section of the positive electrode plate (cross-section perpendicular to the plate face of the positive electrode plate) was subjected to the EBSD measurement at a 1000-fold field of view (125 μm×125 μm) to give an EBSD image. This EBSD measurement was performed using a Schottky field emission scanning electron microscope (model JSM-7800F, manufactured by JEOL Ltd.). For all grains identified in the resultant EBSD image, the angles defined by the (003) planes of the primary grains and the plate face of the positive electrode plate (that is, the tilt of the crystal orientation from the (003) planes) is determined as a tilt angle. The mean value of the angles was determined as an average orientation angle of the primary grains.

<Thickness>

The LCO or LTO sintered plate was polished with a cross-section polisher (CP) (IB-15000CP, manufactured by JEOL Ltd.), and the resultant cross section of the positive electrode plate was observed with SEM (JSM6390LA, manufactured by JEOL Ltd.) to determine the thickness of the positive electrode plate. The thickness of the dried LCO or LTO green sheet described above in Procedures (1a) and (2a) was also determined in the same manner.

<Porosity>

The LCO or LTO sintered plate was polished with a cross-section polisher (CP) (IB-15000CP, manufactured by JEOL Ltd.), and the resultant cross section of the positive electrode plate was observed with SEM (JSM6390LA, manufactured by JEOL Ltd.) at a 1000-fold field of view (125 μm×125 μm). The SEM image was subjected to an image analysis, the area of all pores was divided by the area of the positive electrode, and the resultant value was multiplied by 100 to calculate the porosity (%).

<Mean Pore Diameter>

The mean pore diameter of the LCO or LTO sintered plate was measured by a mercury intrusion method using a mercury porosimeter (Autopore IV 9510, manufactured by Shimadzu Corporation).

<Battery Capacity>

The battery capacity was measured by the following procedures. That is, the battery was charged at a constant voltage of 2.7 V and then discharged at a discharge rate of 0.2 C to measure the initial capacity, and the resultant initial capacity was employed as a battery capacity.

<Energy Density>

The battery capacity was multiplied by the average voltage and divided by the battery volume to calculate the energy density. At that time, the average value of the voltages at SOC 0%, 20%, 40%, 60%, 80% and 100% was used as the average voltage.

<Battery Capacity/Thickness Ratio>

The battery capacity (mAh) was divided by the thickness of the battery (mm) to calculate the battery capacity/thickness ratio (mAh/mm).

<Constant Voltage Charge Cycle Performance>

The constant voltage charge cycle performance (discharge capacity retention) of the battery was measured by the following procedures. The battery was first charged at a constant voltage of 2.7 V and then discharged at a discharge rate of 0.2 C to measure the initial capacity. Then, a total of 100 charge/discharge cycles including charging at a constant voltage of 2.7 V and discharging at a current of 20 mA for 0.5 seconds were conducted. Finally, the battery was charged at a constant voltage of 2.7 V and discharged at 0.2 C, to measure the capacity after cycles. The capacity after cycles measured was divided by the initial capacity and multiplied by 100, to determine the constant voltage charge cycle performance (%) as a discharge capacity retention.

<Resistance Increase Rate after Reflow>

The battery was charged at a constant voltage of 2.7 V, and the DC resistance was measured in a charged state. Then, the battery was discharged at 0.2 C. The battery thus obtained was subjected to a solder reflow process with heating at 260° C. for 30 seconds. The battery after the solder reflow process was charged at a constant voltage of 2.7 V, and the DC resistance was measured. The resistance value after reflow was divided by the resistance value before reflow and multiplied by 100, to calculate the resistance increase rate after reflow (%).

Example 2

A positive electrode plate, a negative electrode plate, and a battery were prepared and evaluated for the various properties as in Example 1 except that powder B composed of LCO particles produced as shown in Table 1 was used instead of powder A.

Example 3

A positive electrode plate, a negative electrode plate, and a battery were prepared and evaluated for the various properties as in Example 1 except that 1) the thickness of the LCO green sheet was reduced so that the thickness of the positive electrode plate was 60 μm, and 2) the thickness of the LTO green sheet was reduced so that the thickness of the negative electrode layer was 70 μm.

Example 4

A positive electrode plate, a negative electrode plate, and a battery were prepared and evaluated for the various properties as in Example 1 except that 1) the thickness of the LCO green sheet was increased so that the thickness of the positive electrode plate was 330 μm, and 2) the thickness of the LTO green sheet was increased so that the thickness of the negative electrode layer was 400 μm.

Example 5

A positive electrode plate, a negative electrode plate, and a battery were prepared and evaluated for the various properties as in Example 1 except that powder C composed of LCO plate particles produced as shown in Table 1 was used instead of powder A.

Example 6

A positive electrode plate, a negative electrode plate, and a battery were prepared and evaluated for the various properties as in Example 1 except that 1) the thickness of the LCO green sheet was reduced so that the thickness of the positive electrode plate was 205 μm, 2) a $Li_2CO_3$ green sheet piece produced by the following procedures was placed on the LCO green sheet as an excess-lithium source before placing the top setter, and 3) the LCO green sheet was fired in two-stage process at 800° C. for 5 hours and then at 840° C. for 20 hours.

(Preparation of $Li_2CO_3$ Green Sheet (Excess-Lithium Source))

$Li_2CO_3$ raw material powder (volume-based particle diameter D50: 2.5 μm, manufactured by THE HONJO CHEMICAL CORPORATION) (100 parts by weight), a binder (poly(vinyl butyral): Product No. BM-2, manufactured by Sekisui Chemical Co., Ltd.) (5 parts by weight), a plasticizer (di-2-ethylhexyl phthalate (DOP), manufactured by Kurogane Kasei Co., Ltd.) (2 parts by weight), and a dispersant (RHEODOL SP-O30, manufactured by Kao Corporation) (2 parts by weight) were mixed. The resultant mixture was defoamed by stirring under reduced pressure to prepare a $Li_2CO_3$ slurry with a viscosity of 4000 cP. The viscosity was measured with an LVT viscometer manufactured by Brookfield. The $Li_2CO_3$ slurry prepared was formed into a sheet on a PET film by a doctor blade process, thereby forming a $Li_2CO_3$ green sheet. The dried thickness of the $Li_2CO_3$ green sheet was selected such that the Li/Co molar ratio of the Li content in the $Li_2CO_3$ green sheet to the Co content in the LCO green sheet had a predetermined value. The dried $Li_2CO_3$ green sheet piece was cut into a size such that the Li/Co molar ratio of the Li content in the $Li_2CO_3$ green sheet to the Co content in the resultant calcined $LiCoO_2$ plate was 0.4.

Example 7

A positive electrode plate, a negative electrode plate, and a battery were prepared and evaluated for the various properties as in Example 1 except that 1) $Li_2CO_3$ raw material powder (volume-based D50 particle size 2.5 μm, manufactured by THE HONJO CHEMICAL CORPORATION) was further added to the LCO slurry to have an excess-Li/Co ratio of 0.2 in the LCO green sheet, 2) the thickness of the LCO green sheet was increased so that the thickness of the positive electrode plate was 320 μm, and 3) the LCO green sheet was fired at 800° C. for 5 hours and then at 800° C. for 20 hours. The excess-Li/Co ratio is the molar ratio of the excess-Li content derived from $Li_2CO_3$ in the LCO green sheet to the Co content in the LCO green sheet.

Example 8

A positive electrode plate and a battery were prepared and evaluated for the various properties as in Example 6 except that 1) the size of the $Li_2CO_3$ green sheet piece to be placed was varied so as to have a Li/Co ratio of 0.6, 2) the LCO green sheet was calcined at 700° C. for 3 hours after degreasing and before firing, and 3) the LCO green sheet was fired in two-stage process at 800° C. for 5 hours and then at 820° C. for 20 hours.

Example 9

A positive electrode plate, a negative electrode plate, and a battery were prepared and evaluated for the various properties as in Example 6 except that 1) the LCO green sheet was calcined at 900° C. for 3 hours after degreasing and before firing, and 2) the LCO green sheet was fired in one-stage process at 820° C. for 10 hours instead of the two-stage process.

Example 10

A positive electrode plate, a negative electrode plate, and a battery were prepared and evaluated for the various properties as in Example 1 except that 1) the LTO green sheet was fired at a temperature of 765° C. instead of 830° C., and 2) the thickness of the LTO green sheet was reduced so that the thickness of the negative electrode layer was 180 μm.

Example 11

A positive electrode plate, a negative electrode plate, and a battery were prepared and evaluated for the various properties as in Example 1 except that 1) the LTO green sheet was fired at a temperature of 700° C. instead of 765° C., and 2) the thickness of the LTO green sheet was increased so that the thickness of the negative electrode layer was 350 μm.

Example 12

A positive electrode plate, a negative electrode plate, and a battery were prepared and evaluated for the various properties as in Example 1 except that 1) the LTO green sheet was roll-pressed before firing, and 2) the $Li_2CO_3$ sheet was placed on the LTO green sheet during firing at 5 mol % to the amount of Li in the LTO green sheet.

Example 13

A positive electrode plate, a negative electrode plate, and a battery were prepared and evaluated for the various properties as in Example 1 except that the LTO powder used was LTO powder with a D50 of 10 μm obtained by spray-drying LTO powder (volume-based D50 particle size: 0.06 μm, manufactured by Sigma-Aldrich Japan), followed by heating at 600° C.

Example 14

A positive electrode plate, a negative electrode plate, and a battery were prepared and evaluated for the various properties as in Example 1 except that the size of each component was varied so that the battery had a coin-shaped outline with a diameter of 20 mm and a thickness of 1.0 mm.

Example 15

A positive electrode plate, a negative electrode plate, and a battery were prepared and evaluated for the various properties as in Example 1 except that 1) the size of each component was varied so that the battery had a coin-shaped outline with a diameter of 20 mm and a thickness of 1.6 mm, 2) the thickness of the LCO green sheet was increased so that the thickness of the positive electrode plate was 450 μm, and 3) the thickness of the LTO green sheet was increased so that the thickness of the negative electrode layer was 500 μm.

Example 16 (Comparison)

A positive electrode plate, a negative electrode plate, and a battery were prepared and evaluated for the various properties as in Example 1 except that 1) a commercially available LCO-coated electrode (manufactured by Hohsen Corp.) was used as a positive electrode plate instead of the LCO sintered plate, and 2) a commercially available LTO-coated electrode (manufactured by Hohsen Corp.) was used as a negative electrode plate instead of the LTO sintered plate.

Example 17 (Comparison)

A positive electrode plate, a negative electrode, and a battery were prepared and evaluated for the various properties as in Example 1 except that 1) a commercially available LCO-coated electrode (manufactured by Hohsen Corp.) was used as a positive electrode plate instead of the LCO sintered plate, and 2) a carbon-coated electrode on a negative electrode current collector produced by the following procedures was used as a negative electrode plate and a negative electrode current collector.

(Production of Carbon-Coated Electrode)

A carbon-coated electrode composed of a carbon layer with a thickness of 280 μm was produced by applying a paste containing a mixture of graphite as an active material and polyvinylidene fluoride (PVDF) as a binder onto a surface of the negative electrode current collector (aluminum foil), followed by drying.

Example 18 (Comparison)

A positive electrode plate, a negative electrode plate, and a battery were prepared and evaluated for the various properties as in Example 1 except that 1) a $Li_4Mn_5O_{12}$ pellet electrode produced with reference to the procedures disclosed in Patent Literature 3 (JP4392189B) was used as a positive electrode plate instead of the LCO sintered plate, and 2) a Li—Al alloy electrode produced with reference to the procedures disclosed in Patent Literature 3 was used as a negative electrode plate instead of the LTO sintered plate.

Example 19

A positive electrode plate, a negative electrode plate, and a battery were prepared and evaluated for the various properties as in Example 1 except that the size of each component was varied so that the battery had a coin-shaped outline with a diameter of 10 mm and a thickness of 0.7 mm.

Production Conditions and Evaluation Results

Table 2 shows the production conditions in Examples 1 to 19, and Tables 3 and 4 show the evaluation results for Examples 1 to 19. Further, Table 1 shows the details of powder A to C mentioned in Table 2.

TABLE 1

| | Positive electrode raw material powder |
|---|---|
| Powder A | $LiCoO_2$ platy particles obtained by mixing $Co_3O_4$ powder (manufactured by SEIDO CHEMICAL INDUSTRY CO., LTD.) and $Li_2CO_3$ powder (manufactured by THE HONJO CHEMICAL CORPORATION) weighed so that the Li/Co molar ratio was 1.01, then holding it at 780° C. for 5 hours, and milling and crushing the resultant powder into a volume-based D50 of 0.4 μm with a pot mill |
| Powder B | $LiCoO_2$ particles obtained by mixing $CoO_4$ powder (manufactured by ISE CHEMICALS CORPORATION) and $Li_2CO_3$ powder (manufactured by THE HONJO CHEMICAL CORPORATION) weighed so that the Li/Co molar ratio was 1.00, then holding it at 700° C. for 5 hours, and crushing the resultant powder into a volume-based D50 of 0.4 μm with a #500 mesh |
| Powder C | $LiCoO_2$ platy particles obtained by mixing $Co_3O_4$ powder (manufactured by ISE CHEMICALS CORPORATION) and $Li_2CO_3$ powder (manufactured by THE HONJO CHEMICAL CORPORATION) weighed so that the Li/Co molar ratio was 1.00, then holding it at 750° C. for 5 hours, and crushing the resultant powder into a volume-based D50 of 0.6 μm with a pot mill |

TABLE 2

| | Positive electrode raw material powder | $Li_2CO_3$ (Internal) Li/Co Excess-Li/Co ratio to $Li_2CO_3$ content in LCO green sheet | $Li_2CO_3$ (Top) Li/Co Li/Co ratio to $Li_2CO_3$ content in $Li_2CO_3$ green sheet | Calcination conditions | Main firing conditions |
|---|---|---|---|---|---|
| Example 1 | A | 0 | 0 | — | 820° C. × 20 h |
| Example 2 | B | 0 | 0 | — | 820° C. × 20 h |
| Example 3 | A | 0 | 0 | — | 820° C. × 20 h |
| Example 4 | A | 0 | 0 | — | 820° C. × 20 h |
| Example 5 | C | 0 | 0 | — | 820° C. × 20 h |
| Example 6 | A | 0 | 0.4 | — | 800° C. × 5 hours and then 840° C. × 20 hours |
| Example 7 | A | 0.2 | 0 | — | 800° C. × 5 hours and then 840° C. × 20 hours |
| Example 8 | A | 0 | 0.6 | 700° C. × 3 h | 800° C. × 5 hours and then 840° C. × 20 hours |
| Example 9 | A | 0 | 0.4 | 900° C. × 3 h | 820° C. × 10 h |
| Example 10 | A | 0 | 0 | — | 820° C. × 20 h |
| Example 11 | A | 0 | 0 | — | 820° C. × 20 h |
| Example 12 | A | 0 | 0 | — | 820° C. × 20 h |
| Example 13 | A | 0 | 0 | — | 820° C. × 20 h |
| Example 14 | A | 0 | 0 | — | 820° C. × 20 h |
| Example 15 | A | 0 | 0 | — | 820° C. × 20 h |
| Example 16* | Commercially available LCO-coated electrode | | | | |
| Example 17* | Commercially available LCO-coated electrode | | | | |
| Example 18* | $Li_4Mn_5O_{12}$ pellet electrode | | | | |
| Example 19 | A | 0 | 0 | — | 820° C. × 20 h |

Symbol * represents a comparative example.

TABLE 3

| | Battery outline | | | Positive electrode | | | | Negative electrode | | | |
|---|---|---|---|---|---|---|---|---|---|---|---|
| | Diameter (mm) | Thickness (mm) | Type* | Average orientation angle | Thickness (μm) | Porosity (%) | Mean porosity (μm) | Type* | Thickness (μm) | Porosity (%) | Mean porosity (μm) |
| Example 1 | 12 | 1.0 | LCO sintered plate | 16° | 220 | 38 | 0.8 | LTO sintered plate | 250 | 38 | 0.2 |
| Example 2 | 12 | 1.0 | LCO sintered plate | Random | 220 | 38 | 0.8 | LTO sintered plate | 250 | 38 | 0.2 |
| Example 3 | 12 | 1.0 | LCO sintered plate | 16° | 60 | 38 | 0.8 | LTO sintered plate | 70 | 38 | 0.2 |
| Example 4 | 12 | 1.0 | LCO sintered plate | 16° | 330 | 38 | 0.8 | LTO sintered plate | 400 | 38 | 0.2 |
| Example 5 | 12 | 1.0 | LCO sintered plate | 30° | 220 | 38 | 0.8 | LTO sintered plate | 250 | 38 | 0.2 |
| Example 6 | 12 | 1.0 | LCO sintered plate | 16° | 205 | 20 | 0.8 | LTO sintered plate | 250 | 38 | 0.2 |
| Example 7 | 12 | 1.0 | LCO sintered plate | 16° | 320 | 60 | 0.8 | LTO sintered plate | 250 | 38 | 0.2 |
| Example 8 | 12 | 1.0 | LCO sintered plate | 16° | 220 | 38 | 10.0 | LTO sintered plate | 250 | 38 | 0.2 |
| Example 9 | 12 | 1.0 | LCO sintered plate | 16° | 220 | 38 | 0.1 | LTO sintered plate | 250 | 38 | 0.2 |
| Example 10 | 12 | 1.0 | LCO sintered plate | 16° | 220 | 38 | 0.8 | LTO sintered plate | 180 | 20 | 0.2 |
| Example 11 | 12 | 1.0 | LCO sintered plate | 16° | 220 | 38 | 0.8 | LTO sintered plate | 350 | 60 | 0.2 |
| Example 12 | 12 | 1.0 | LCO sintered plate | 16° | 220 | 38 | 0.8 | LTO sintered plate | 250 | 38 | 0.02 |
| Example 13 | 12 | 1.0 | LCO sintered plate | 16° | 220 | 38 | 0.8 | LTO sintered plate | 250 | 38 | 0.7 |
| Example 14 | 20 | 1.0 | LCO sintered plate | 16° | 220 | 38 | 0.8 | LTO sintered plate | 250 | 38 | 0.2 |
| Example 15 | 20 | 1.6 | LCO sintered plate | 16° | 450 | 38 | 0.8 | LTO sintered plate | 500 | 38 | 0.2 |
| Example 16* | 12 | 1.0 | LCO-coated electrode | Random | 180 | 40 | 0.5 | LTO-coated electrode | 250 | 40 | 0.5 |
| Example 17* | 12 | 1.0 | LCO-coated electrode | Random | 180 | 40 | 0.5 | Carbon-coated electrode | 280 | 40 | 0.5 |

TABLE 3-continued

| | Battery outline | | | Positive electrode | | | | Negative electrode | | | |
|---|---|---|---|---|---|---|---|---|---|---|---|
| | Diameter (mm) | Thickness (mm) | Type* | Average orientation angle | Thickness (μm) | Porosity (%) | Mean porosity (μm) | Type* | Thickness (μm) | Porosity (%) | Mean porosity (μm) |
| Example 18* | 20 | 1.6 | Li$_4$Mn$_5$O$_{12}$ pellet electrode | Random | 750 | — | — | Li—Al alloy electrode | 300 | — | — |
| Example 19 | 10 | 0.7 | LCO sintered plate | 16° | 220 | 38 | 0.8 | LTO sintered plate | 250 | 38 | 0.2 |

Symbol * represents a comparative example.
*LCO represents LiCoO$_2$, and LTO represents Li$_4$Ti$_5$O$_{12}$.

TABLE 4

| | Battery performance | | | | |
|---|---|---|---|---|---|
| | Energy density (mWh/cm$^3$) | Battery capacity (mAh) | Battery capacity/ thickness ratio | Constant voltage charge cycle performance | Resistance increase rate after reflow |
| Example 1 | 110 | 5.5 | 5.5 | 99% | 1% |
| Example 2 | 110 | 5.5 | 5.5 | 90% | 1% |
| Example 3 | 35 | 1.8 | 1.8 | 99% | 1% |
| Example 4 | 150 | 7.8 | 7.8 | 99% | 1% |
| Example 5 | 110 | 5.5 | 5.5 | 97% | 1% |
| Example 6 | 110 | 5.5 | 5.5 | 96% | 1% |
| Example 7 | 110 | 5.5 | 5.5 | 99% | 1% |
| Example 8 | 110 | 5.5 | 5.5 | 99% | 1% |
| Example 9 | 110 | 5.5 | 5.5 | 97% | 1% |
| Example 10 | 110 | 5.5 | 5.5 | 96% | 1% |
| Example 11 | 110 | 5.5 | 5.5 | 99% | 1% |
| Example 12 | 110 | 5.5 | 5.5 | 97% | 1% |
| Example 13 | 110 | 5.5 | 5.5 | 97% | 1% |
| Example 14 | 125 | 16 | 16.0 | 99% | 1% |
| Example 15 | 200 | 45 | 28.1 | 99% | 1% |
| Example 16* | 90 | 4.4 | 4.4 | 99% | 300% |
| Example 17* | 90 | 4.4 | 4.4 | Short circuit | 350% |
| Example 18* | 100 | 22 | 14 | 30% | 3% |
| Example 19 | 55 | 2.7 | 3.9 | 99% | 1% |

Symbol * represents a comparative example.

What is claimed is:

1. A coin-shaped lithium secondary battery comprising:
a positive electrode plate which is a lithium complex oxide sintered plate;
a negative electrode plate which is a titanium-containing sintered plate;
a separator interposed between the positive electrode plate and the negative electrode plate;
an electrolytic solution with which the positive electrode plate, the negative electrode, and the separator are impregnated; and
an exterior body comprising a closed space, the closed space accommodating the positive electrode plate, the negative electrode plate, the separator, and the electrolytic solution,
the lithium secondary battery having a thickness of 0.7 to 1.6 mm and a diameter of 10 to 20 mm;
wherein the separator is made of sintered ceramics selected from the group consisting of MgO, Al$_2$O$_3$, ZrO$_2$, SiC, Si$_3$N$_4$, AlN, and cordierite.

2. The coin-shaped lithium secondary battery according to claim 1, wherein the lithium secondary battery has an energy density of 35 to 200 mWh/cm$^3$.

3. The coin-shaped lithium secondary battery according to claim 1, wherein the lithium secondary battery has a battery capacity of 1.8 to 45 mAh.

4. The coin-shaped lithium secondary battery according to claim 1, wherein a value obtained by dividing the battery capacity of the lithium secondary battery by the thickness of the positive electrode plate is 1.8 to 28.1 mAh/mm.

5. The coin-shaped lithium secondary battery according to claim 1, wherein the positive electrode plate has a thickness of 60 to 450 μm.

6. The coin-shaped lithium secondary battery according to claim 1, wherein the lithium complex oxide is lithium cobaltate.

7. The coin-shaped lithium secondary battery according to claim 1, wherein the positive electrode plate has a porosity of 20 to 60%.

8. The coin-shaped lithium secondary battery according to claim 1, wherein the positive electrode plate has a mean pore diameter of 0.1 to 10.0 μm.

9. The coin-shaped lithium secondary battery according to claim 1, wherein the positive electrode plate is an oriented positive electrode plate containing a plurality of primary grains composed of the lithium complex oxide, the plurality of primary grains being oriented at an average orientation angle of over 0° and 30° or less with respect to the plate face of the positive electrode plate.

10. The coin-shaped lithium secondary battery according to claim 1, wherein the negative electrode plate has a thickness of 70 to 500 μm.

11. The coin-shaped lithium secondary battery according to claim 1, wherein the titanium-containing sintered body comprises lithium titanate or niobium titanium complex oxide.

12. The coin-shaped lithium secondary battery according to claim 1, wherein the negative electrode plate has a porosity of 20 to 60%.

13. The coin-shaped lithium secondary battery according to claim 1, wherein the negative electrode plate has a mean pore diameter of 0.08 to 5.0 μm.

14. The coin-shaped lithium secondary battery according to claim 1, wherein the electrolytic solution is a solution containing lithium borofluoride ($LiBF_4$) in a non-aqueous solvent composed of at least one selected from the group consisting of γ-butyrolactone (GBL), ethylene carbonate (EC), and propylene carbonate (PC).

15. The coin-shaped lithium secondary battery according to claim 1, further comprising:
  a positive electrode current collector; and
  a negative electrode current collector.

16. The coin-shaped lithium secondary battery according to claim 1, wherein the exterior body comprises a positive electrode can, a negative electrode can, and a gasket, and the positive electrode can and the negative electrode can are crimped via the gasket to form the closed space.

17. An IoT device comprising:
  a circuit board; and
  the coin-shaped lithium secondary battery according to claim 1.

18. The IoT device according to claim 17, wherein the coin-shaped lithium secondary battery is mounted on the circuit board by reflow solder.

* * * * *